United States Patent [19]
Ishizaka et al.

[11] 3,840,393
[45] Oct. 8, 1974

[54] METHOD OF MANUFACTURING SELF-BONDING SILICONE INSULATION MATERIALS

[75] Inventors: Mitsuo Ishizaka; Tasuku Suzuki; Yukihiro Mikogami, all of Yokohama; Iamotsu Wada, Tokyo, all of Japan

[73] Assignee: Toshiba Silicone Kabushiki Kaisha, Tokyo-to, Japan

[22] Filed: July 27, 1972

[21] Appl. No.: 275,488

[30] Foreign Application Priority Data
July 30, 1971 Japan.............................. 46-56776

[52] U.S. Cl. ... 117/123 D, 117/124 F, 117/126 GS, 117/138.8 F, 117/138.8 N, 117/140 A, 117/161 ZA, 174/110 S, 260/46.5 G, 260/46.5 UA, 260/825

[51] Int. Cl...... C08f 11/04, C09d 3/82, B32b 27/04

[58] Field of Search.... 117/124 F, 126 GS, 161 ZA, 117/138.8 F, 138.8 N, 123 D, 140 A; 260/825, 46.5 UA, 46.5 G; 174/110 S

[56] References Cited
UNITED STATES PATENTS

| | | | |
|---|---|---|---|
| 2,486,162 | 10/1949 | Hyde........................... | 260/46.5 UA |
| 2,530,635 | 11/1950 | Sowa........................... | 260/46.5 UA |
| 2,595,728 | 5/1952 | Swiss et al. .................... | 117/126 GS |
| 2,789,155 | 4/1957 | Morshall et al............. | 260/46.5 UA |
| 2,882,183 | 4/1959 | Bond et al. .................. | 117/126 GS |
| 2,976,185 | 3/1961 | McBride...................... | 117/138.8 F |
| 3,269,981 | 8/1966 | Goosens....................... | 260/46.5 G |
| 3,342,763 | 9/1967 | Rogers et al. ................ | 117/138.8 F |
| 3,373,049 | 3/1968 | Nitzsche et al.............. | 117/161 ZA |
| 3,489,782 | 1/1970 | Pruvost...................... | 260/46.5 |
| 3,527,659 | 9/1970 | Keil ................................. | 117/124 F |
| 3,546,156 | 12/1970 | Baronnier et al. .......... | 260/46.5 UA |
| 3,576,779 | 4/1971 | Holdstock et al............. | 260/46.5 G |
| 3,619,256 | 11/1971 | Pepe et al..................... | 117/124 F |
| 3,624,030 | 11/1971 | Pruvost et al. .............. | 260/46.5 UA |
| 3,628,996 | 12/1971 | Weber......................... | 117/138.8 F |
| 3,629,297 | 12/1971 | Autonen ..................... | 260/46.5 UA |
| 3,650,808 | 3/1972 | Gagnon ......................... | 117/138.8 F |
| 3,676,420 | 7/1972 | Fulton et al.................. | 117/161 ZA |
| 3,740,247 | 6/1973 | Schweigert et al. ........... | 117/140 A |

Primary Examiner—William D. Martin
Assistant Examiner—William H. Schmidt
Attorney, Agent, or Firm—Stewart and Kolasch, Ltd.

[57] ABSTRACT

A vinyl containing organopolysiloxane varnish is first prepared by cohydrolyzing and polymerizing a mixture of silanes of (a) 2 to 25 mol percent of a trifunctional component expressed by $CH_2 = CHSiX_3$ where X represents a hydrolyzable radical, (b) 20 to 60 mol percent of a trifunctional component expressed by $RSiX_3$ where R represents a phenyl radical or a methyl radical, at least 16 mol percent of the R being phenyl radicals, and X a hydrolyzable radical, and (c) 30 to 70 mol percent of a difunctional component expressed by

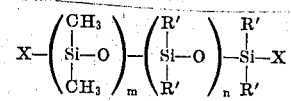

where R' represents a methyl radical, a vinyl radical or a phenyl radical, X a hydrolyzable radical or a hydroxyl radical, m equals an integer of from 4 to 100, and n equals an integer of from 0 to 10. After incorporated with 0.1 to 5 percent, by weight, of an organic peroxide, the organopolysiloxane varnish is applied onto an insulation substrate.

Suitable insulation substrates include a glass cloth, a glass mat, a polyester film, a polyimido film, a polyamide fiber mat, a non-woven fabric of polyester fibers, a mica paper, mica flakes or the like.

9 Claims, No Drawings

1

METHOD OF MANUFACTURING SELF-BONDING SILICONE INSULATION MATERIALS

BACKGROUND OF THE INVENTION

This invention relates to a method of manufacturing a self-bonding silicone insulation in the form or sheets of tapes so that they can be applied to insulate electric machines and apparatus without the necessity of applying a varnish in air or under vacuum and have excellent heat resistant property, electrical characteristics, water proof property, corona resistant property, long operating life as well as long shelf life.

The method of insulating electrical machines and apparatus with a semi-cured silicone insulation tape or sheet is an efficient method of improving the process step and decreasing the cost because this type of adhesive tape does not require application of the varnish with a brush or vacuum impregnation. However, the conventional semi-cured silicone insulation tape or sheet is not perfectly stable so that its useful shelf life is relatively short. Moreover, it is often necessary to use such a tape or sheet in combination with a release sheet and when swelled by a solvent the semi-cured resin is dissolved thus rendering difficult the wrapping operation.

Prior art self-bonding insulation material utilizing a commercially available silicone resin requires a drying temperature as high as from 200°C to 250°C. Although a catalyst consisting of an aliphatic salt of lead, iron, zinc or tin or a quaternary ammonium salt was used to cure and dry the insulation material at a lower temperature, the shelf life of the self-bonding material was decreased to only from 1 week to 1 month. Where a silicone resin of high flexibility is used, although the resin is adhesive at room temperature, it will cure when heated so that the resin can not take the state of B stage. Silicone resins that can be convertible to B stage are not suitable to prepare insulation tapes or sheets because their flexibility is low.

SUMMARY OF THE INVENTION

Accordingly, it is an object of this invention to provide an improved non-tacky self-bonding silicone insulation sheet or tape having a long shelf life and excellent heat resistant, water resistant, and corona resistant properties as well as excellent electrical characteristics.

Another object of this invention is to obtain a self-bonding silicone insulation sheet or tape which forms a rigid and dense insulation system when applied to insulated conductors.

According to this invention, at first a vinyl radical containing organopolysiloxane is prepared and an organic peroxide is incorporated into the varnish to act as a curing catalyst. Then the varnish is applied to an insulation substrate, for example a glass cloth, a glass mat, a polyester film, a polyimido film, a polyamide fiber mat, a nonwoven fabric of polyester fibers, a mica paper, mica flakes or the like by brushing, spraying or vacuum impregnation and the coated substrate is dried by heating it to a temperature ranging from room temperature to 150°C to semi-cure the resin thereby obtaining a non-tacky self-bonding insulation material in the form of a tape or sheet.

The average composition of the organopolysiloxane utilized in this invention can be expressed by the following formula

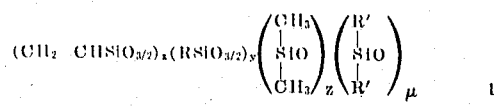

where R represents a methyl radical or a phenyl radical, at least 16 mol percent of the R radical being phenyl radical, R' represents a methyl radical, an ethyl radical, a phenyl radical or a vinyl radical, and $x + y + z + \mu = 100$, $x = 2 - 25$, $y = 20 - 60$, and $z + \mu = 30 - 70$.

The ranges of $x$, $y$, $z$ and $\mu$ are selected on the following ground. Where $x$ is less than 2 it takes a long time and high temperature to cure the resins whereas where $x$ is larger than 25, the curing proceeds rapidly but the cured resins are brittle. Moreover, the resins are expensive because the cost of the raw material vinyl silane is expensive. Where $y$ is less than 20 or $z + \mu$ is more than 70 the polymerized resins tend to gel thus making it difficult to prepare desired resins. Where $y$ is more than 60 or $z + \mu$ is less than 30, the hardness of the resulting resins increases thereby decreasing the adhesive strength to the insulation substrate. Such resins are not suitable for use to prepare self-bonding insulation material. Where at least 16 mol percent of the R radical of the unit $RSiO_{3/2}$ does not consist of phenyl radicals the resins tend to gel in the process of preparing the organopolysiloxane. For this reason, it is essential that at least 16 percent of the R radical should consist of phenyl radicals.

The raw materials for respective units of the compound expressed by Equation 1 are as follows:

As the raw material for $(CH_2 = CH)SiO_{3/2}$ may be used $CH_2 = CHSiX_3$, where X represents a hydrolyzable radical, for example a halogen atom or an alkoxy radical wherein the number of carbon atoms does not exceed 6.

As the raw material for $RSiO_{3/2}$ may be used $RSiX_3$ where X represents a hydrolizable radical, that is a halogen atom or an alkoxy radical wherein the number of carbon atoms does not exceed 6 and R represents a methyl radical or a phenyl radical.

Further, as the raw material for

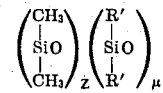

may be used a linear polysiloxane having reactive functional radicals on both ends as shown by a general formula

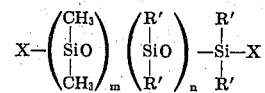

where $m = 4 - 100$, $n = 0 - 10$, $m + n = 4 - 100$, X represents a hydrolyzable radical, that is a halogen radical or an alkoxy radical wherein the number of carbon atoms does not exceed 6 or a hydroxy radical and R' represents a methyl radical, an ethyl radical, a vinyl radical or a phenyl radical.

In the polysiloxane expressed by formula 2, where $n$ and $m + n$ exceed 100 respectively it is difficult to obtain homogeneous resins, whereas, in the case where $n$ and $m + n$ are less than 4, the mechanical strength of the cured resins tends to decrease.

After preparing the raw materials described above, they are admixed at a ratio shown in formula 1 to form organopolysiloxanes. If desired, these raw materials may be dissolved in an inert solvent such as toluene and xylene. Then the mixture of the raw materials or their solutions is added to water of a quantity sufficient to cohydrolyze them. Dependent upon the type of the silane an alcohol such as methanol, ethanol, propanol and butanol may be incorporated as a cohydrolyzing agent. After removing the acid formed by the cohydrolysis reaction the organopolysiloxane is caused to polymerize at a temperature ranging from room temperature to 160°C, in the presence of a strong basic polymerization catalyst such as sodium hydroxide, potassium hydroxide and cesium hydroxide dissolved in an inert solvent such as toluene and xylene at a concentration of 5 – 70 percent, preferably 20 to 50 percent.

Upon completion of the condensation reaction described above, a mineral acid such as hydrochloric acid, sulfuric acid and phosphoric acid, an organic acid such as formic acid, acetic acid and propionic acid or tricresyl phosphate is added to neutralize the basic catalyst employed, and the resulting salt is removed by filtration thus obtaining an organopolysiloxane containing vinyl radicals.

The organic peroxides utilized in this invention includes benzoyl peroxide, di(tertiary-butyl) peroxide and dicumyl peroxide, and the quantity of the organic peroxide is selected to be 0.1 to 5 percent, by weight, based on the weight of said vinyl radical containing organopolysiloxane. The reason of this is that with less than 0.1 percent, by weight, of the peroxide any catalytic action can not be expected, whereas incorporation of the peroxide in excess of 5 percent, by weight, does not improve the catalytic action to any appreciable extent.

When applying the vinyl containing organopolysiloxane onto the insulator substrate, and where it is desirable to increase the adhesive strength, a silane such as γ-aminopropyltriethoxysilane, γ-aminopropylmethyldiethoxysilane, γ-methacryloxypropyltriethoxysilane, Vinyltriethoxysilane, glycidoxypropyltriethoxysilane or the like may be incorporated to act as a treating agent.

The varnish thus prepared and containing the vinyl containing organopolysiloxane and an organic peroxide is coated upon or impregnated into a thin insulation substrate, a glass cloth for instance. The coated substrate is then dried at a temperature from room temperature to 150°C for 5 minutes to 5 hours to remove the organic solvent thus obtaining a semicured, non-tacky and self-bonding silicone insulation sheet or tape.

The novel silicone insulation sheet may be used to insulate various types of electric machines and apparatus. For example, the sheet is wrapped about an insulated coil of a dynamo-electric machine and the resulting insulation of the coil is then shaped by a press mold or a sacrifice taping of a shrinkable polyethyleneterephthalate film applied on the insulated coil while being heated to a temperature of from 150°C to 200°C thereby thoroughly impregnating the insulation substrate with the semicured silicone resin coated thereon and rapidly curing the impregnated silicone resin. For this reason, it is not necessary to relay upon any vacuum impregnation process. Moreover, since the novel insulation sheet has a moderate flexibility and self-bonding property, it is extremely suitable for wrapping operations. Further, since the novel insulation sheet or tape has excellent corona resistant property and heat resistant property, electric coils insulated therewith can operate at high voltages without the fear of deterioration. The novel insulation sheet or tape has a very long shelf life of more than 6 months.

DESCRIPTION OF THE PREFERRED EMBODIMENTS

Example 1

615 g (42.5 mol percent) of phenyltrichlorosilane, 131 g (10 mol percent) of vinyltriethoxysilane and 254 g (47.5 mol percent in terms of siloxane units) of dimethylpolysiloxane end blocked with chlorine atoms and having 15 siloxane units on the average were dissolved in 500 g of toluene and the resulting solution was hydrolyzed by dropping it in a mixture of 1,500 g of water and 1,000 g of toluene over a period of 15 minutes. After washing with water, 0.05 percent, by weight based on the weight of the solid component, of potassium hydroxide was added to the hydrolyzed product and the mixture was heated to the reflux temperature of toluene (about 110°C) for one hour while removing the water of condensation, thereby obtaining a vinyl radical containing organopolysiloxane solution. The solution was then neutralized with acetic acid and excess toluene was removed to increase the concentration. The concentrated solution was filtered to remove the resulting salt thereby obtaining a clear liquid (varnish) containing 6 percent of non-volatile component and having a viscosity of 42 centipoise (at 25°C).

Dicumyl peroxide of a quantity corresponding to 1.5 percent of the non-volatile components was incorporated to the varnish and the varnish was then applied onto a glass cloth having a thickness of 0.07 mm to form a resin coating containing 60 percent, by weight based on the weight of the glass cloth, of the resin component. The coated glass cloth was then dried by heating it to a temperature of 80°C for 30 minutes to obtain a self-bonding insulation sheet having a thickness of 0.15 mm and the coated resin was converted into semicured state. This sheet had a shelf life of more than 6 months.

The sheet was cured by heating it at a temperature of 180°C for 1 hour and the dielectric strength thereof was measured at 100 points. The mean breakdown voltage was above 8.2 KV.

Example 2

The insulation varnish obtained in Example 1 was used to bond together a glass cloth having a thickness of about 0.03 mm and a mica paper having a thickness of 0.08 mm in such a quantity as to ensure a resin content of 45 percent, by weight based on the weight of the composite insulation substrate. The composite substrate was heated to a temperature of 70°C for one hour to form a silicone-glass-mica sheet having a thickness of 0.18 mm in which the coated resin has been semicured. The insulation sheet was slitted into tapes having a width of 25 mm each and the tape was wrapped about a coil of a dynamoelectric machine. Then a shrinkable polyester film was wrapped about the silicone-glass-mica tape and the assembly was dried by heating it to a temperature of 180°C for 10 hours to form a dense insulation system. The breakdown strength per mm of this insulation system was found to be 45 KV.

Example 3

Table 1

| Sample | A | B | C | D | E | F | G | H |
|---|---|---|---|---|---|---|---|---|
| phenyltrichlorosilane | 20 | 30 | 40 | 45 | 35 | 40 | 37.5 | 37.5 |
| methyltrichlorosilane | — | — | — | — | — | — | 5 | 10 |
| vinyltrichlorosilane | 25 | 15 | 10 | 10 | 10 | 10 | 10 | 10 |
| dimethylpolysiloxane end blocked with chlorine atoms | 60 | 55 | 50 | 45 | 55 | 50 | 47.5 | 42.5 |
| mean degree of polymerization (n) | 10 | 10 | 15 | 15 | 25 | 25 | 15 | 15 |

(The data shown in the table except those representing n represent mol percent)

Vinyl containing organopolysiloxane solution (varnish) was prepared from each sample by hydrolyzing and polymerizing 1,000 g of each of mixed chlorosilanes by the same process as in Example 1. 1.5 percent, by weight based on the non-volatile component, of dicumyl peroxide was incorporated into respective one of the resulting organopolysiloxane solutions (varnishes) and the varnishes were used to prepare silicone-glass-mica sheets by the method described in Example 2 wherein the coated resins have been semi-cured. It was found that these insulation sheets have excellent flexibility or pliability and a shelf-life of more than 6 months.

The insulation tapes having a width of 25 mm and prepared by slitting the insulation sheets were wrapped about insulated conductors and the assembly was dried by heating it at a temperature of 180°C for 1 hour. The semicured resins of the insulation tapes became viscous and then cured to form rigid and dense insulation systems.

We claim:

1. A method of manufacturing a self-bonding silicone insulation material comprising the steps of preparing a vinyl containing organopolysiloxane by cohydrolyzing a mixture of silanes comprising (a) 2 to 25 mol percent of a trifunctional component expressed by $$CH_2 = CHSiX_3$$

where X represents a hydrolyzable radical, (b) 20 to 60 mol percent of a trifunctional component expressed by $$RSiX_3$$

where R represents a phenyl radical or a methyl radical, at least 16 mol percent of the R being phenyl radicals, and X a hydrolyzable radical, and (c) 30 to 70 mol percent of a difunctional component expressed by

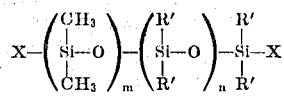

where R' represents a methyl radical, a vinyl radical or a phenyl radical, X a hydrolyzable radical or a hydroxyl radical, m equals an integer of from 4 to 100, and n equals an integer of from 0 to 10, and polymerizing the hydrolized product; incorporating and mixing 0.1 to 5 percent, by weight, or an organic peroxide with said vinyl radical containing organopolysiloxane to obtain a silicone varnish; applying the silicone varnish onto an insulation substrate in the form of a sheet or tape; and heating and drying the coated substrate.

2. The method as claimed in claim 1 wherein said insulation substrate is glass cloth, a glass mat, a polyester film, a polyimido film, a polyamide fiber mat, a nonwoven fabric of polyester fibers, a mica paper or mica flakes.

3. The method as claimed in claim 1 wherein said insulation substrate coated with said silicone varnish is semi-cured by heating said substrate at a temperature from room temperature to 150°C.

4. The method as claimed in claim 1 wherein said vinyl containing organopolysiloxane has an average composition expressed by a general formula

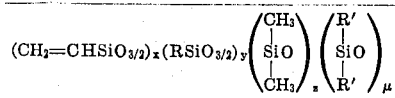

where R represents a methyl radical or a phenyl radical, at least 16 mol percent of the R radical being phenyl radical, R' represents a methyl radical, an ethyl radical, a phenyl radical or a vinyl radical, and wherein $x + y + z + \mu = 100$, $x = 2 - 25$, $y = 20 - 60$ and $z + \mu = 30 - 70$.

5. The method as claimed in claim 1 wherein said organic peroxide is selected from the group consisting of benzoyl peroxide, di(tertiary-butyl) peroxide and dicumyl peroxide.

6. The method of claim 1, wherein a diethoxy silane is incorporated into said silicone varnish to act as a treating agent.

7. The method as claimed in claim 1, wherein a triethoxy silane is incorporated into said silicone varnish to act as a treating agent.

8. The method as claimed in claim 6, wherein the diethoxy silane is γ-aminopropylmethyldiethoxysilane.

9. The method as claimed in claim 7, wherein the triethoxy silane is selected from the group consisting of γ-aminopropyltriethoxysilane, γ-methacryloxypropyltriethoxysilane, vinyltriethoxysilane and glicidoxypropyltriethoxysilane.

* * * * *